(12) United States Patent
Dai

(10) Patent No.: US 12,196,344 B2
(45) Date of Patent: Jan. 14, 2025

(54) GARDEN HOSE

(71) Applicant: ZHEJIANG TIANTI RUBBER & PLASTIC TECHNOLOGY CO., LTD., Zhejiang (CN)

(72) Inventor: Weiqiang Dai, Zhejiang (CN)

(73) Assignee: ZHEJIANG TIANTI RUBBER & PLASTIC TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/485,609

(22) Filed: Oct. 12, 2023

(65) Prior Publication Data

US 2024/0344641 A1  Oct. 17, 2024

(30) Foreign Application Priority Data

Apr. 14, 2023  (CN) .......................... 202310400999.8

(51) Int. Cl.
*F16L 11/112* (2006.01)
*F16L 25/00* (2006.01)
*F16L 33/24* (2006.01)
*F16L 33/26* (2006.01)

(52) U.S. Cl.
CPC ............ *F16L 11/112* (2013.01); *F16L 33/24* (2013.01); *F16L 25/0036* (2013.01); *F16L 25/0063* (2013.01); *F16L 33/26* (2013.01)

(58) Field of Classification Search
CPC .......... F16L 11/112; F16L 33/24; F16L 11/11; F16L 11/115; F16L 11/085; F16L 11/15; F16L 33/26; F16L 25/0036; F16L 25/0063
See application file for complete search history.

(56) References Cited

U.S. PATENT DOCUMENTS

| | | | |
|---|---|---|---|
| 2,987,329 A * | 6/1961 | Barton | F16L 33/26 |
| 4,268,333 A * | 5/1981 | Schwarz | F16L 11/085 |
| 4,952,262 A * | 8/1990 | Washkewicz | |
| 2006/0006645 A1* | 1/2006 | Mukawa | F16L 11/085 |
| 2007/0079885 A1* | 4/2007 | Zaborszki | F16L 11/15 |
| 2010/0051131 A1* | 3/2010 | Dickel | F16L 25/0036 |
| 2013/0000767 A1* | 1/2013 | Nonaka | |
| 2017/0159858 A1* | 6/2017 | Strunk | F16L 33/26 |
| 2018/0045342 A1* | 2/2018 | Gonzalez | F16L 11/085 |
| 2018/0111475 A1* | 4/2018 | Wexler | F16L 11/085 |
| 2020/0041217 A1* | 2/2020 | Liang | F16L 11/15 |
| 2022/0381388 A1* | 12/2022 | Powell | F16L 11/085 |

FOREIGN PATENT DOCUMENTS

WO  WO-2016172326 A1 * 10/2016

* cited by examiner

*Primary Examiner* — William S. Choi
(74) *Attorney, Agent, or Firm* — MUNCY, GEISSLER, OLDS & LOWE, P.C.

(57) ABSTRACT

A garden hose includes a corrugated pipe and a braided layer. The corrugated pipe defines an axial direction. The braided layer is sleeved to the corrugated pipe. An inner diameter of the braided layer is smaller than an outer diameter of the corrugated pipe when the corrugated pipe and the braided layer are separated from each other, and the braided layer is radially stretched by and abutted against the corrugated pipe when being sleeved to the corrugated pipe.

1 Claim, 4 Drawing Sheets

GARDEN HOSE

BACKGROUND OF THE INVENTION

Field of the Invention

The present invention relates to a garden hose.

Description of the Prior Art

Generally, a garden hose is used in outdoor and needs to have aging resistance, high toughness, temperature resistance and anti-corrosion properties. However, a conventional garden hose is made of polyvinyl chloride or rubber, which is heavy and has a narrow range of working temperature; therefore, the conventional garden hose is easy to become brittle or sticky and is not durable to use.

The present invention is, therefore, arisen to obviate or at least mitigate the above-mentioned disadvantages.

SUMMARY OF THE INVENTION

The main object of the present invention is to provide a garden hose which has good pressure resistance and wear resistance effects and is durable to use.

To achieve the above and other objects, the present invention provides a garden hose, including: a corrugated pipe and a braided layer. The corrugated pipe defines an axial direction. The braided layer is sleeved to the corrugated pipe. An inner diameter of the braided layer is smaller than an outer diameter of the corrugated pipe when the corrugated pipe and the braided layer are separated from each other, and the braided layer is radially stretched by and abutted against the corrugated pipe when being sleeved to the corrugated pipe.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 4 for a preferable embodiment of the present invention. A garden hose 1 of the present invention includes a corrugated pipe 10 and a braided layer 20.

The corrugated pipe 10 defines an axial direction A. The braided layer 20 is sleeved to the corrugated pipe 10. An inner diameter D1 of the braided layer 20 is smaller than an outer diameter D2 of the corrugated pipe 10 when the corrugated pipe 10 and the braided layer 20 are separated from each other, and the braided layer 20 is radially stretched by and abutted against the corrugated pipe 10 when being sleeved to the corrugated pipe 10. Therefore, the braided layer 20 prevents the corrugated pipe 10 from abrasion, maintains the flexibility of the garden hose 1, and provides appropriate radial restriction to the corrugated pipe 10 to increase pressure resistance.

Figure 1:
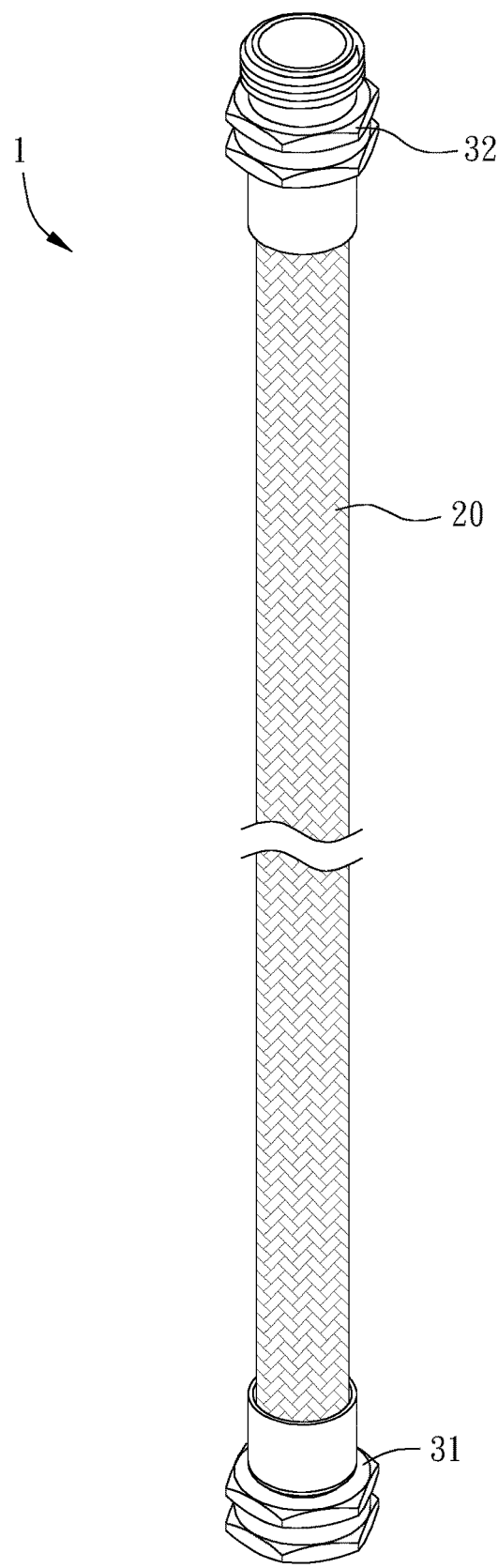
FIG. 1 is a stereogram of a preferable embodiment of the present invention.
Figure 2:
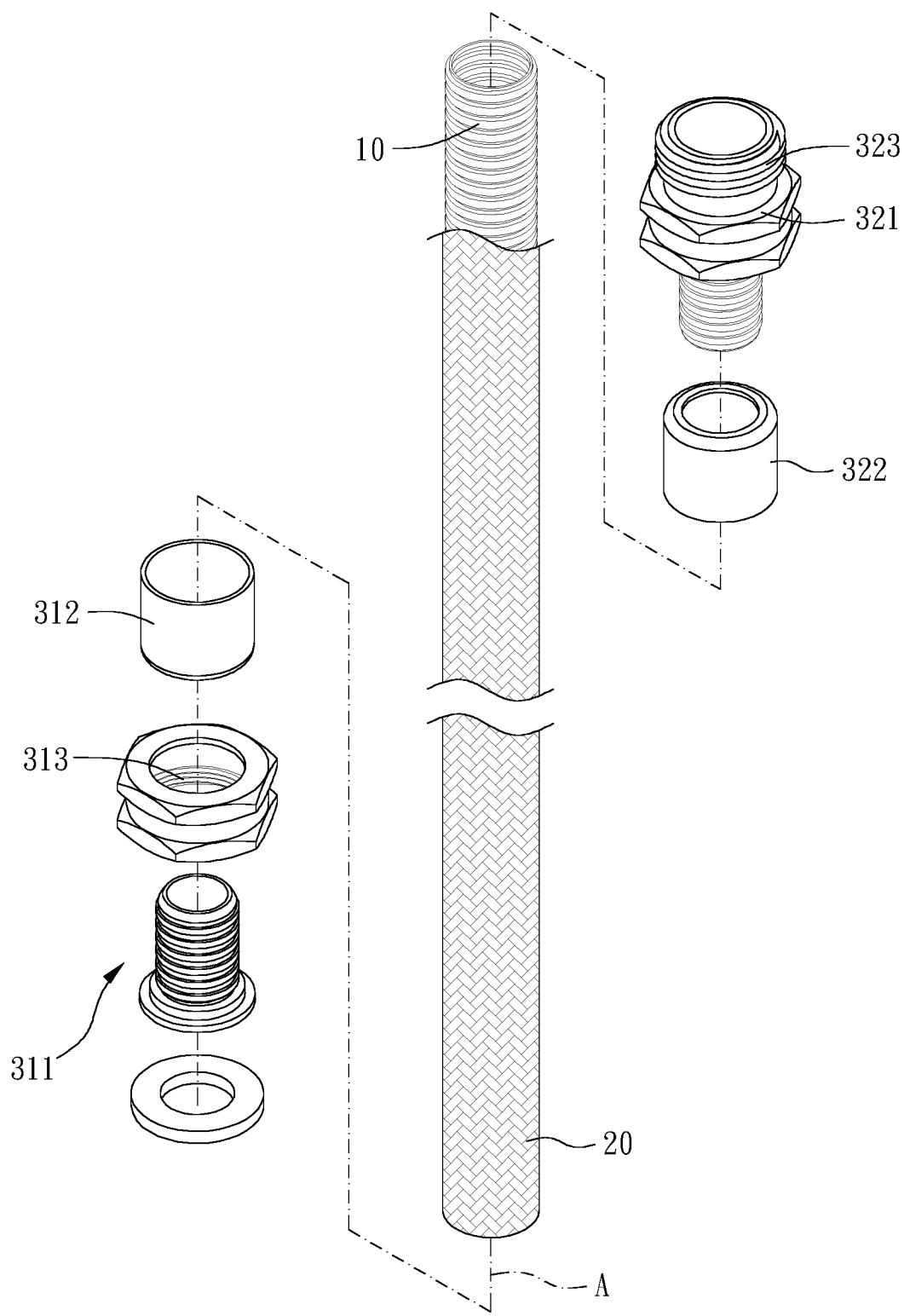
FIG. 2 is a breakdown drawing of a preferable embodiment of the present invention.
Figure 3:
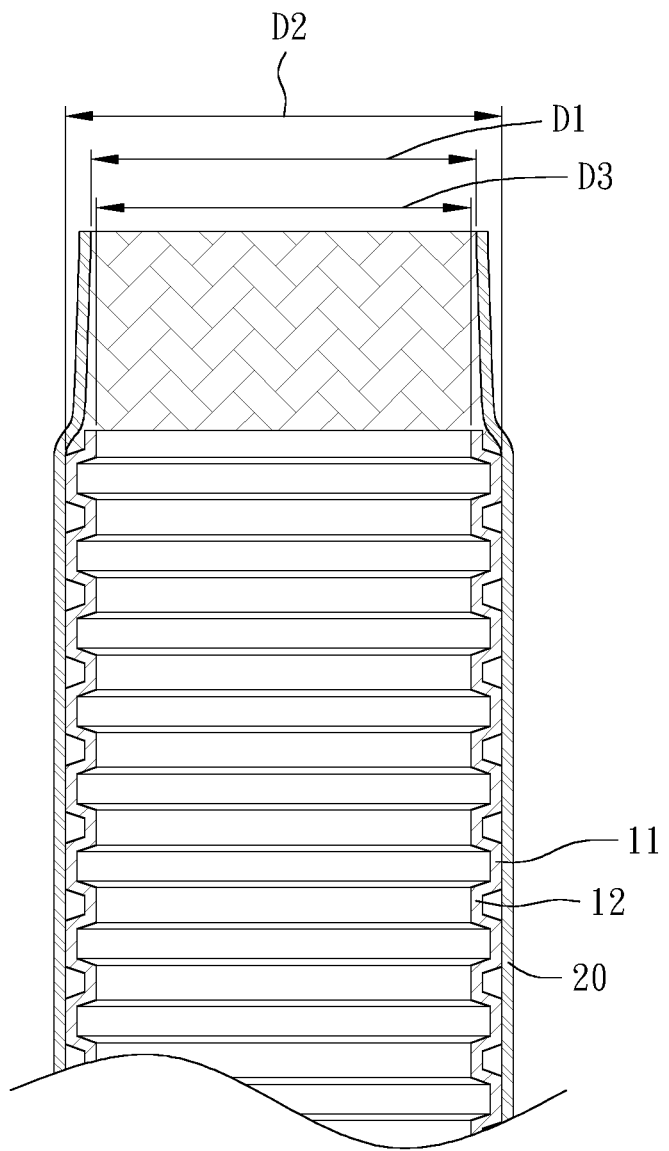
FIG. 3 is a partial cross-sectional view of a preferable embodiment of the present invention.

Preferably, the corrugated pipe 10 is made of polyethylene, which provides a range of working temperature between −40° C. and 90° C. so that the corrugated pipe 10 has preferable resistance to high and low temperatures. The corrugated pipe 10 includes a plurality of annular projections 11 and a plurality of annular recessions 12 arranged alternatively, and the braided layer 20 is abutted against the plurality of annular projections 11 and spaced apart from the plurality of annular recessions 12, as shown in FIG. 3. Therefore, the garden hose 1 has anti-twist effect and a large bending radius.

Specifically, the braided layer 20 includes a plurality of braiding yarns 21, and each of the plurality of braiding yarns 21 includes a plurality of fibers 211 made of at least one of polyester (preferable), nylon, polypropylene, polyvinyl chloride or rubber so as to provide sufficient structural strength, anti-cut effect and aging resistance. In this embodiment, each of the plurality of braiding yarns 21 includes five said fibers 211 arranged side by side, and each of the plurality of fibers 211 is a monofilament with a diameter between 0.2 mm and 0.3 mm (which is about 0.26 mm (+0.02 mm) in this embodiment), which has preferable structural strength. In manufacturing, the braided layer 20 may be made by a braiding machine with 48 carriers, and a braiding angle of the braided layer 20 is larger than 45 degrees so as to provide expected diametrical dimension of the braided layer 20 to urge the corrugated pipe 10. In other embodiments, the number of said fibers of each of the plurality of braiding yarns may be changed to meet different requirements; the number of the carriers of the braiding machine may be changed to meet different requirements; the plurality of fibers of each of the plurality of braiding yarns may be made of at least two kinds of different materials.

Moreover, a hardness of the corrugated pipe 10 is larger than a hardness of the braided layer 20, and the inner diameter D1 of the braided layer 20 is larger than an inner diameter D3 of the corrugated pipe 10. Therefore, the braided layer 20 provides sufficient radial force to the corrugated pipe 10 without deformation of the corrugated pipe 10 due to the radial force. According to a burst test, a maximum hydraulic pressure of the garden hose 1 is about 2900 psi.

Figure 4:
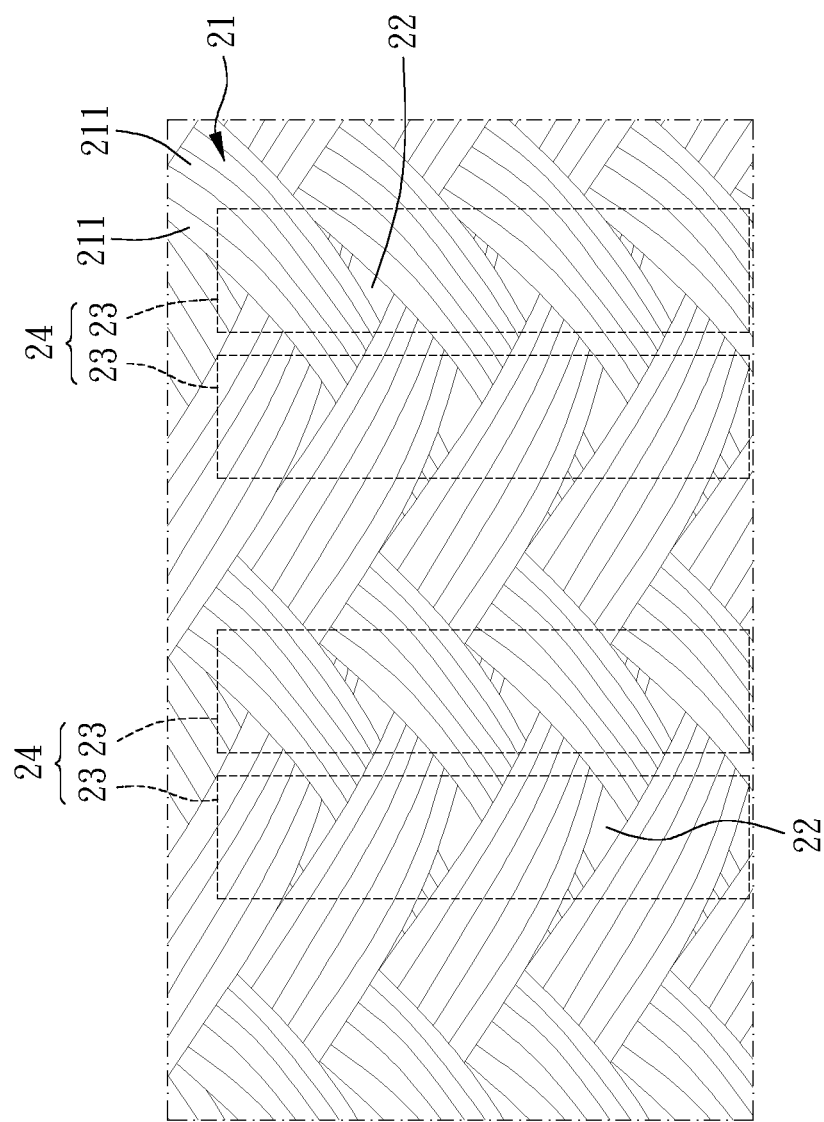
FIG. 4 is a partial enlargement of a braided layer according to a preferable embodiment of the present invention.

The braided layer 20 further includes a plurality of through holes 22 defining by the plurality of braiding yarns 21, the plurality of through holes 22 are spacedly arranged and divided into a plurality of rows 23, and two adjacent rows 23 are defined as a group 24. A diametrical dimension of each of the plurality of through holes 22 is smaller than a width of one of the plurality of braiding yarns 21. As viewed in a direction oblique to the axial direction A (as shown in FIG. 4), said groups 24 are equiangularly arranged around the corrugated pipe 10, and a distance between two said rows 23 in the same one of said groups 24 is shorter than a distance between two said rows 23 in different two of said groups 24, which provides special visual effect. In this embodiment, each of the plurality of through holes 22 is quadrilateral.

The garden hose 1 further includes two connectors 31, 32 disposed on two ends of the garden hose 1, each of the two connectors 31, 32 includes a connecting member 311, 321 and a sleeve member 312, 322, each said connecting member 311, 321 is partially disposed within an end of the corrugated pipe 10, and each said sleeve member 312, 322 is sleeved on an outer surface of the braided layer 20 and radially overlapped with one said connecting member 311, 321 to partially restrict the corrugated pipe 10 and the braided layer 20 therebetween. The connecting member 311 of one of the two connectors 31 has an inner threaded portion 313, and the connecting member 321 of the other of the two connectors 32 has an outer threaded portion 323 for easy and stable connection. The two connectors 31, 32 are made of stainless steel, aluminum or copper so as to have good pressure resistance. In other embodiments, both of said connecting members of the two connectors may have said inner threaded portions or said outer threaded portions to meet different requirements.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A garden hose, including:
  a corrugated pipe, defining an axial direction; and
  a braided layer, sleeved to the corrugated pipe;
  wherein an inner diameter of the braided layer is smaller than an outer diameter of the corrugated pipe when the corrugated pipe and the braided layer are separated from each other, and the braided layer is radially stretched by and abutted against the corrugated pipe when being sleeved to the corrugated pipe;
  wherein the braided layer includes a plurality of braiding yarns and a plurality of through holes defined by the plurality of braiding yarns, the plurality of through holes are spacedly arranged and divided into a plurality of rows, two adjacent rows are defined as a group, as viewed in a direction oblique to the axial direction, said groups are equiangularly arranged around the corrugated pipe, and a distance between two said rows in the same one of said groups is shorter than a distance between two said rows in different two of said groups;
  wherein a diametrical dimension of each of the plurality of through holes is smaller than a width of one of the plurality of braiding yarns;
  wherein the corrugated pipe is made of polyethylene;
  the braided layer includes a plurality of braiding yarns, and each of the plurality of braiding yarns includes a plurality of fibers made of at least one of polyester, nylon, polypropylene, polyvinyl chloride or rubber; each of the plurality of fibers is a monofilament with a diameter between 0.2 mm and 0.3 mm; each of the plurality of braiding yarns includes five said fibers arranged side by side; the braided layer is made by a braiding machine with 48 carriers; each of the plurality of through holes is quadrilateral; a braiding angle of the braided layer is larger than 45 degrees;
  the corrugated pipe includes a plurality of annular projections and a plurality of annular recessions arranged alternatively, and the braided layer is abutted against the plurality of annular projections and spaced apart from the plurality of annular recessions;
  a hardness of the corrugated pipe is larger than a hardness of the braided layer;
  the inner diameter of the braided layer is larger than an inner diameter of the corrugated pipe;
  the garden hose further includes two connectors disposed on two ends of the garden hose, each of the two connectors includes a connecting member and a sleeve member, each said connecting member is partially disposed within an end of the corrugated pipe, and each said sleeve member is sleeved on an outer surface of the braided layer and radially overlapped with one said connecting member to partially restrict the corrugated pipe and the braided layer therebetween; the connecting member of one of the two connectors has an inner threaded portion, and the connecting member of the other of the two connectors has an outer threaded portion; and the two connectors are made of stainless steel, aluminum or copper.

* * * * *